(12) United States Patent
Fardig et al.

(10) Patent No.: US 11,556,609 B1
(45) Date of Patent: Jan. 17, 2023

(54) ANTICIPATORY LOADING OF WEBSITES ON USER DEVICES

(71) Applicant: Lenovo (Singapore) Pte. Ltd., Singapore (SG)

(72) Inventors: Matthew Fardig, Boonville, IN (US); Lindsay Nelson, Highlands Ranch, CO (US); Joshua Smith, Milton, FL (US); Dane Hixson, Eden, UT (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/710,609

(22) Filed: Mar. 31, 2022

(51) Int. Cl.
  *G06F 16/957* (2019.01)
  *H04L 43/0823* (2022.01)
(52) U.S. Cl.
  CPC ...... *G06F 16/9574* (2019.01); *H04L 43/0823* (2013.01)
(58) Field of Classification Search
  CPC . G06F 16/957–16/986; H04L 43/08–43/0823; H04L 67/2866–67/2895; H04L 67/56–67/75
  See application file for complete search history.

(56) References Cited

U.S. PATENT DOCUMENTS

| | | | |
|---|---|---|---|
| 9,898,311 B1* | 2/2018 | Hartmann | G06F 21/51 |
| 9,972,213 B1* | 5/2018 | Berger | G09B 5/02 |
| 2018/0007161 A1* | 1/2018 | Hwang | H04L 67/5681 |

* cited by examiner

*Primary Examiner* — Clayton R Williams
(74) *Attorney, Agent, or Firm* — Ference & Associates LLC (57) ABSTRACT

One embodiment provides a method, the method including: receiving, at a website anticipation system, an indication of a plurality of user devices to be in operative communication with a central device during a predetermined time period; detecting, using the website anticipation system, at least one website to be accessed by the plurality of user devices during the predetermined time period, wherein the at least one website is to be requested by the central device; and prior to the central device requesting the plurality of user devices access the website, preloading, using the website anticipation system, at least a portion of the website on a least a subset of the plurality of user devices.

20 Claims, 3 Drawing Sheets

ANTICIPATORY LOADING OF WEBSITES ON USER DEVICES

BACKGROUND

With the increase in virtualization, more meetings are being conducted using remote communication connections and software that facilitates the meetings. One area that has seen a surge in virtualization is school or other classroom settings. Rather than all students and a teacher being physically located in the same space, the teacher can be located in one physical location and one or more of the students can be located in different physical locations. Classroom management software is employed to allow the teacher to transmit information to the student devices simultaneously. Additionally, the teacher's console, or central system, provides some control over the devices of the student(s), or user devices. For example, the central device can dictate websites or applications that can be accessed by the user devices during the classroom time, or predetermined time period.

BRIEF SUMMARY

In summary, one aspect provides a method, the method including: receiving, at a website anticipation system, an indication of a plurality of user devices to be in operative communication with a central device during a predetermined time period; detecting, using the website anticipation system, at least one website to be accessed by the plurality of user devices during the predetermined time period, wherein the at least one website is to be requested by the central device; and prior to the central device requesting the plurality of user devices access the website, preloading, using the website anticipation system, at least a portion of the website on a least a subset of the plurality of user devices.

Another aspect provides an information handling device, the information handling device including: a plurality of user devices; a central device; a processor operatively coupled to the plurality of user devices and the central device; a memory device that stores instructions that, when executed by the processor, causes the information handling device to: receive, at a website anticipation system, an indication of the plurality of user devices to be in operative communication with the central device during a predetermined time period; detect, using the website anticipation system, at least one website to be accessed by the plurality of user devices during the predetermined time period, wherein the at least one website is to be requested by the central device; and prior to the central device requesting the plurality of user devices access the website, preload, using the website anticipation system, at least a portion of the website on a least a subset of the plurality of user devices.

A further aspect provides a product, the product including: a computer-readable storage device that stores executable code that, when executed by a processor, causes the product to: receive, at a website anticipation system, an indication of a plurality of user devices to be in operative communication with a central device during a predetermined time period; detect, using the website anticipation system, at least one website to be accessed by the plurality of user devices during the predetermined time period, wherein the at least one website is to be requested by the central device; and prior to the central device requesting the plurality of user devices access the website, preload, using the website anticipation system, at least a portion of the website on a least a subset of the plurality of user devices.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When dictating the websites or applications that can be accessed by the user devices, the central device can not only dictate which websites or applications that can be accessed by the user devices, but can also dictate when the website or application becomes accessible. In other words, as the teacher is teaching or moving through the class agenda, the teacher can identify and push websites to the user devices, thereby allowing the user device to access the website at that time. These may be referred to as push websites. However, generally the website is not loaded onto the user device(s) until the central device provides the indication to the user devices to access the website. Thus, after the central device provides the indication for the user device(s) to access the website, there is a length of time that occurs when each user device loads and accesses the website. In other words, the teacher has to wait on the website to load on the user device(s) before proceeding with the class or lesson.

Since not all users have the same hardware and/or network connections, the length of time and successfulness for loading of websites on each device can vary significantly. While some user devices may be able to load and access the website very quickly, other user devices may be much slower. Additionally, while loading the website on each device, errors can occur that lengthen the amount of time for loading the website. For example, the website may require the user to provide user credentials, the loading of the website may timeout, the website may not load correctly, and/or the like, all which increase the length of time needed to load the website. Thus, the length of time the teacher has to wait can be significant since each of the user device(s) needs to have access to the website before the teacher can continue. This results in a significant waste of time for the teacher and students alike.

The conventional solutions do not really address this problem. One way that may be utilized is that a teacher may push a website to the user devices before it is needed. However, when the teacher does this, the student now has access to the website, which may result in the student not paying attention to the teacher because they are browsing the website. Additionally, pre-pushing the website may not always be feasible. For example, if the teacher wants the students to access a website at the beginning of class, for example, a website for the classroom book, the teacher has no way of sending that request until the user devices are actually connected to the central device at the prescribed time period. In other words, the teacher device cannot push a website to the student device until the student devices are actually in communication with the teacher device.

Accordingly, the described system and method provides a technique for preloading a website on a plurality of user devices before a request by a central device is received to load the websites is received by detecting that the website will be requested by the central device during a predetermined time period. The website anticipation system receives an indication of a plurality of user devices to be in communication with a central device during a predetermined time period. For example, the system may receive or identify that students, each having a user device, will be connected to a teacher, having a central device, during a predetermined time period, for example, a scheduled class time.

The system may detect at least one website to be accessed by the user devices during the predetermined time period. The website may be requested by the central device during the predetermined time period. Detecting the website may include accessing a class schedule or agenda, books associated with the class, and/or other secondary sources that may identify a website that will need to be accessed. Detecting the website may also include using teacher historical data, audio data, and/or any other source that may identify a website. In response to detecting the website to be accessed by the user devices and prior to actually receiving the request, the system may preload at least a portion of the website on at least a subset of the user devices. In other words, the system starts loading the websites onto the user devices before the request to access the website is received at the user devices. Upon receiving the request to access the website, the website may be fully loaded and accessible or may be at least partially loaded onto the user devices, thereby reducing the length of time that has to be spent waiting for the websites to load on the user devices.

Therefore, a system provides a technical improvement over traditional methods for loading websites on a plurality of user devices. The system is able to detect that a website to be accessed by user devices will be requested by a central device at some point during a predetermined time period (e.g., during a class meeting time, etc.). Upon this detection, the system is able to preload the websites onto the user devices. Since the system does not require that the devices are currently in communication with the central device before preloading the website, the websites can be ready to be accessed as soon as the user devices and central device are connected, which means that the website can be accessible even at the very beginning of a time period, which is not possible with current conventional techniques.

Additionally, since the websites are detected and loaded before being requested by the central device, the websites are loaded and accessible by the time the request is received, which reduces or eliminates the amount of time that has to be spent waiting on the website to load on each of the user devices. Also, the websites are not accessible until the request is received, so even though the websites are loaded, they are not accessible by the students until the request is received. Thus, the described system and method provides a technique for loading websites on a plurality of user devices before a request for loading the website is received at the user devices, thereby allowing the websites to be loaded and ready for use when the request to view the website is received by the central devices providing a quicker and more efficient website loading technique than conventional systems.

The illustrated example embodiments will be best understood by reference to the figures. The following description is intended only by way of example, and simply illustrates certain example embodiments.

Figure 1:
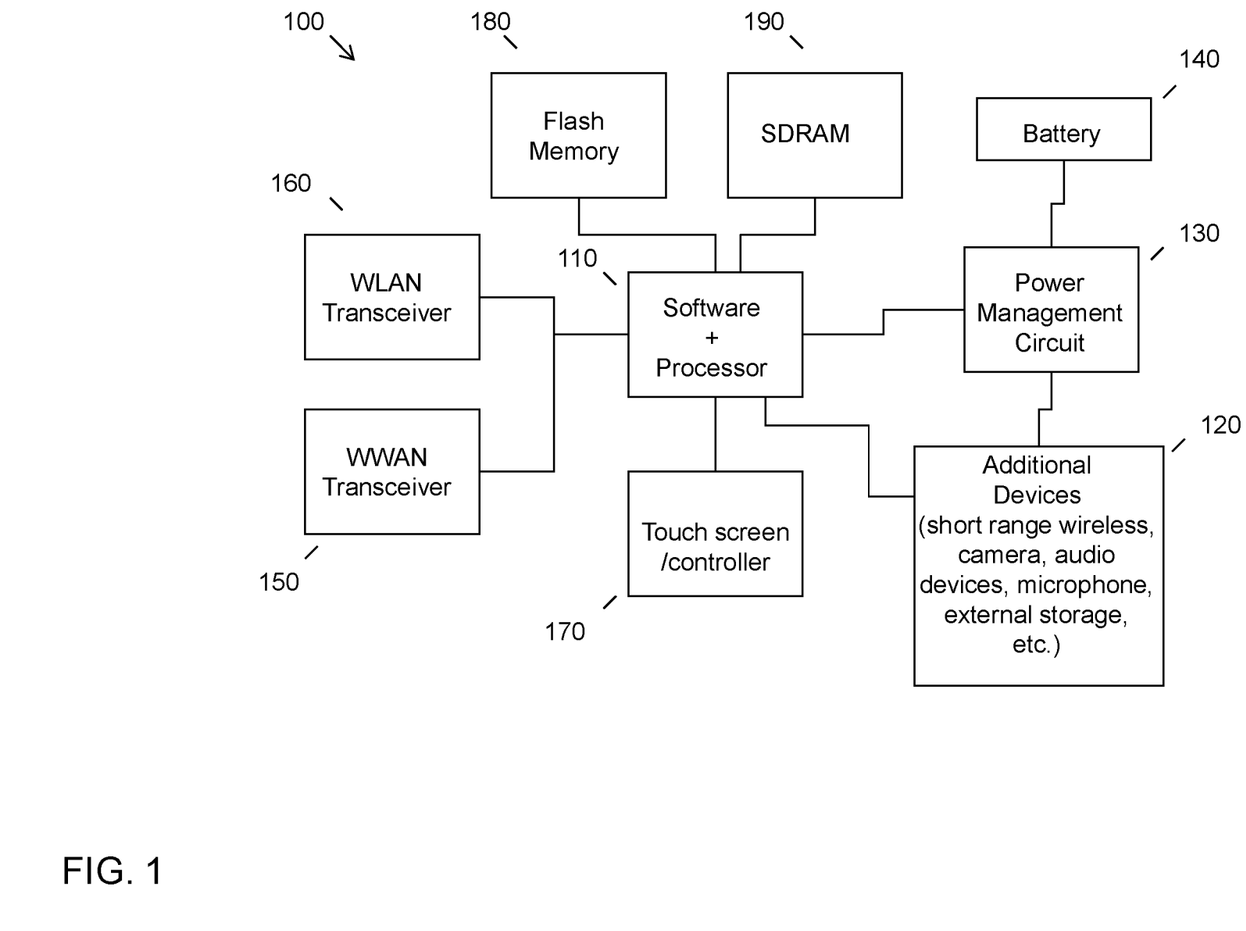
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/ rendering. System 100 also typically includes various memory devices, for example flash memory 180 and synchronous dynamic random-access memory (SDRAM) 190.

Figure 2:
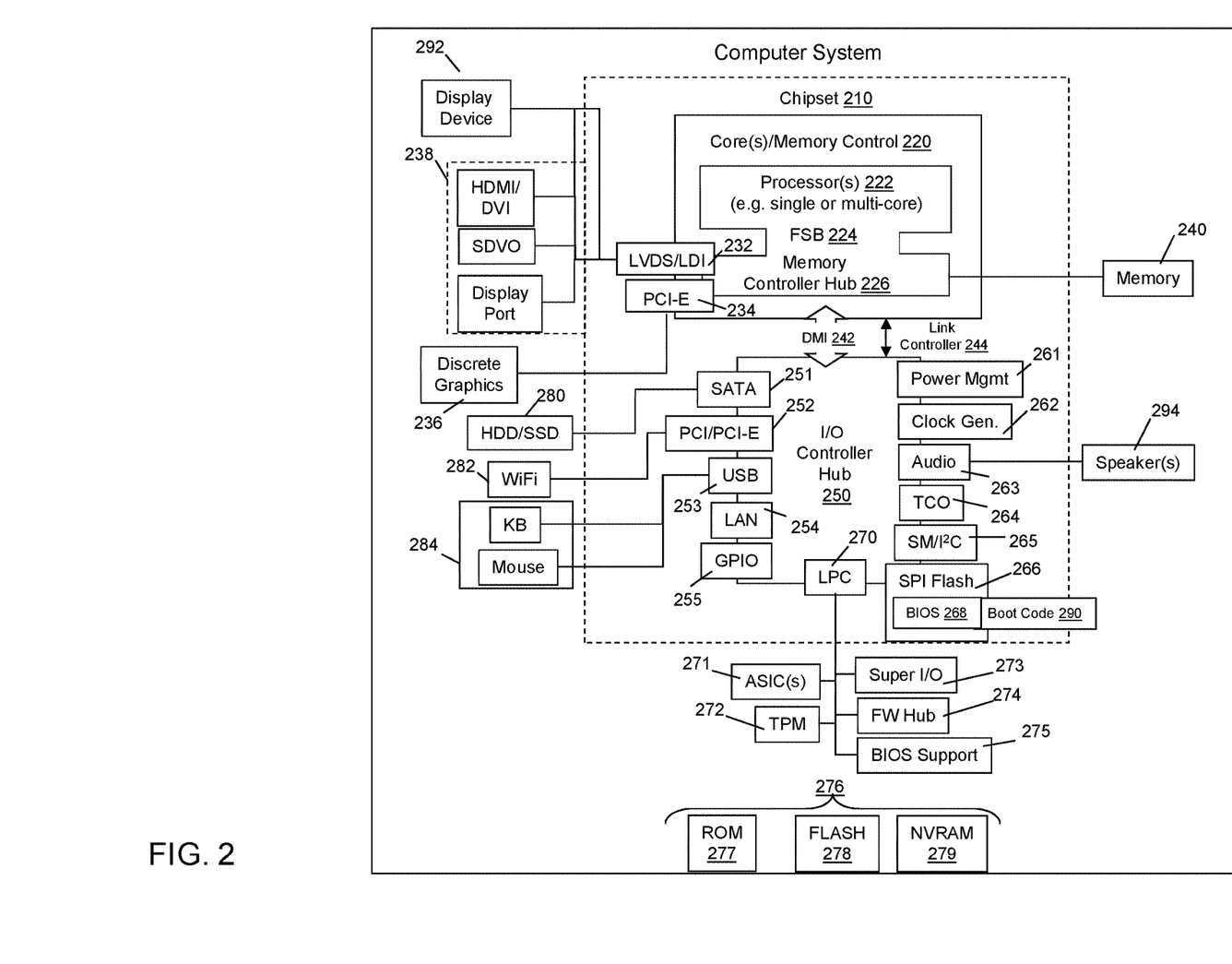
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that detects and preloads websites on a plurality of user devices. For example, the circuitry outlined in FIG. 1 may be implemented in a tablet or smart phone embodiment, whereas the circuitry outlined in FIG. 2 may be implemented in a personal computer embodiment.

Figure 3:
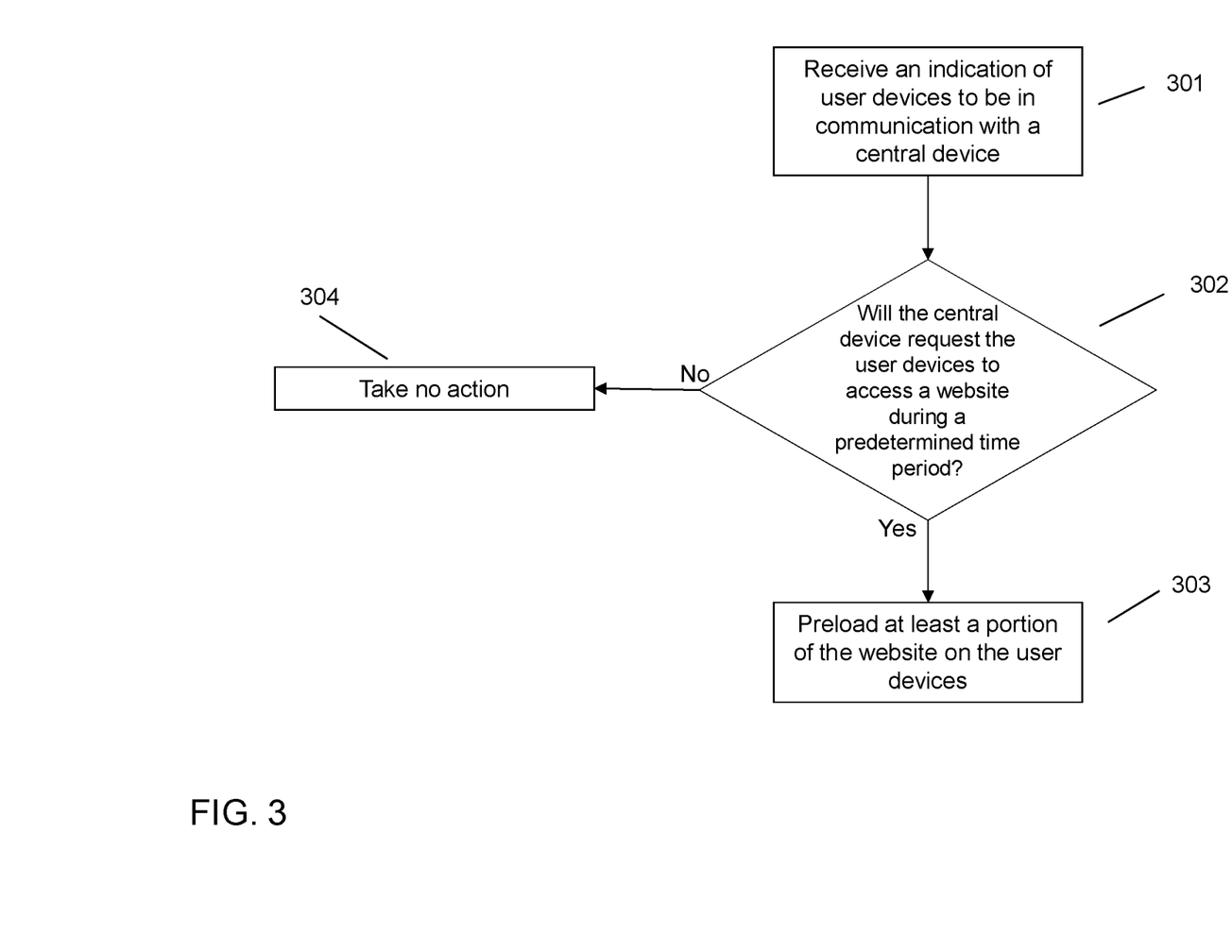
FIG. 3 illustrates an example method for preloading a website on a plurality of user devices before a request by a central device is received to load the websites is received by detecting that the website will be requested by the central device during a predetermined time period.

FIG. 3 illustrates an example method for preloading a website on a plurality of user devices before a request by a central device is received to load the websites is received by detecting that the website will be requested by the central device during a predetermined time period. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to detect and preload a website. Additionally, the website anticipation system includes modules and features that are unique to the described system.

As an example that will be referred to frequently herein, one of the uses or applications of the website anticipation system is a classroom setting having at least two participants located in different physical locations and communicating via one or more communication connections. Generally, the teacher, professor, or other user leading the class, referred to herein as a teacher for ease of readability but not meant to be limiting to such, will have the central device. In conventional classroom management software, this central device is referred to as a console, teacher console, or the like. The user who is a participant and receiving information from the teacher will be referred to as a student, but is not limited to a traditional student definition. Rather, the student may be any person or user who is connected to and receiving information, including communications, websites, applications, documents, and/or the like, from the central device. The student has a user device that is used to communicate with the central device.

The classroom setting can be completely virtual or remote, meaning the teacher is in one physical location and each of the students is in a different physical location from the teacher and other students. The classroom setting may be completely in-person with all the students and teacher in the same physical location, like a classroom. In this scenario, all of the students and the teacher may each have a device used for communication therebetween. The classroom setting may also be a mixed classroom setting where some students may be in the same physical location as other students or the teacher and other students or the teacher may be located in other physical locations. In each of these settings, each of the students and the teacher may have an individual device. However, it should be noted that students may have the ability to share devices in some situations and the described system can still be utilized. Additionally, some students and/or the teacher may have multiple devices that can be connected together. While the example of a classroom, teacher, and students will be referred to herein, the described system and method is not limited to such an example classroom setting.

At 301, the website anticipation system receives an indication of a plurality of user devices to be in operative communication with a central device during a predetermined time period. At receipt of the indication, the user devices may be in operative communication with the central device. For example, the students may have connected to a classroom which then connects the students to the teacher. The devices may not be in direct communication with each other and, instead, the devices may have some type of software, for example, classroom management software, that facilitates communication between the user devices and the central device. Thus, the communications between the devices may occur through or be otherwise facilitated using the classroom management software. This may be the communication scheme regardless of when the user devices start communication with the central device. In other words, whether the user devices are already in communication with the central device when the indication is received or come into communication with the central device after the indication is received, the general communication scheme is the same.

At receipt of the indication, the user devices may not yet be connected and in communication with the central device. Since the user devices and central device may be connected in a classroom setting, the devices are connected during a predetermined time period, for example, a scheduled meeting time, a scheduled classroom time, and/or the like. It should be noted that while most classes are scheduled well in advanced of the class time, a scheduled time could be scheduled a very short time before the scheduled time, for example, a minute or two before the scheduled time or even a few seconds before the scheduled time. The predetermined time period may also have a specified duration. Thus, the website anticipation system knows when the user devices and central device will be connected and communicating with each other even if they are not yet communicating with each other.

In the case that the devices are already communicating, the indication may be the devices being in communication with each other, the devices accessing the classroom management software or other software that facilitates the classroom setting, and/or the like. In the case that the devices are not already communicating, the indication may be any information that can be used to identify what devices will be or should be communicating with each other and when the communication will occur. Thus, the information may include a classroom schedule, a student class schedule, a teacher class schedule, a meeting or classroom invitation or calendar notification or invitation, class roster, previously enrolled students, and/or the like. The information may also include information contained within the classroom management software, for example, scheduled events, historical schedules, and/or the like.

The website anticipation system may also use historical information to identify schedules and devices that are connected during predetermined time periods. For example, the system may identify that at a particular time each week or each day for a particular duration, certain devices are connected and communicating. This can allow the system to automatically generate a device schedule. Thus, the system may use a learning algorithm to generate a device schedule that allows the system to anticipate connections between devices and times of those connections. A combination of indicators may also be used to identify when and what devices will be connected.

At 302, the website anticipation system may determine if the central device will request the user devices to access a website during the predetermined time period. To determine if the central device will request the user devices to access a website, the system may access one or more secondary sources that may provide an indication of material that will be covered within the class. For example, the system may access a class agenda, class schedule, coursebook, teacher notes, and/or the like. The system may utilize one or more text recognition and/or natural language processing techniques or analysis to identify text within the secondary sources and identify if the text corresponds to a website address and/or other materials that may correspond to push websites that will be provided by the central device. These sources may identify website addresses or indications of materials that will be used throughout the predetermined time period. Thus, the system may identify a reference to a website in the secondary sources. It should be noted that while materials are identified separately from websites, this is just to be complete. In practice, the materials, for example, handouts, coursebooks, notes, and/or the like, would be accessed via a website. Thus, the term "website" encompasses all materials, including website addresses, that may be included in a push website request.

The system may also identify if the central device will request the user devices to access a website or other materials during the predetermined time period by identifying attributes or preferences corresponding to a particular teacher, a particular class or subject, a particular topic within a class, a particular time period, and/or the like. The attributes or preferences may be set or input by a user or may be identified from historical information corresponding to the teacher, class or subject, topic, time period, and/or the like. Using the historical information, the system can identify correlations between a particular factor (teacher, class or subject, topic, time period, etc.) and requested websites or materials and even a timing of the request within the predetermined time period. As an example, the system may learn, from the historical information, that a particular teacher always requests the students open the coursebook at the beginning of class, regardless of the class, topic, or subject. As another example, the system may learn, from the historical information, that a particular topic within a class generally results in a particular website being requested to be accessed. Similarly, crowd-sourced information can be used in a similar fashion to identify possible websites or materials that will be requested.

The system may also identify if the central device will request the user devices access a website or materials utilizing audio that occurs during the predetermined time period (or a historical occurrence of the predetermined time period). The system may utilize one or more speech processing and natural language processing techniques to identify information contained in the audio. References to websites or materials in the audio information can provide an indication that the central device will request the user devices to access a website. The audio information may also contain references to topics or other identifiers that have corresponding websites or materials that are requested to be accessed. For example, a teacher may be explaining a particular concept to the students and the system may have identified, using the secondary sources, historical information, attributes or preferences of a factor, a model (discussed below), and/or the like, that the concept has a corresponding website or materials.

The system may additionally, or alternatively, use one or more machine-learning models, neural networks, and/or other learning algorithms. The models or algorithms can be trained using secondary sources, teacher information, class information, and/or audio data, and identified websites or other materials that are included in push website requests. The trained model and/or algorithm can then be used to make predictions and/or identify websites and/or other materials that may be included in a push website request. The model and/or algorithm can receive feedback on the predictions, which may not be direct user feedback, and ingest the feedback to make the model more accurate and refined. Feedback may include determining if a user did indeed make a push website request with the website or material that the model had identified. Thus, the user does not need to provide direct feedback to the model. Rather, the model can automatically identify and obtain input or non-input that can be defined as feedback for updating the model.

If the system determines that the central device will not request the user devices access a website during the predetermined time period at 302, the system may take no action at 304. In other words, the website anticipant system will not attempt to preload a website on the user devices. The system may also not attempt to preload a website if a website is unable to be detected accurately, a user has identified that websites, either generally or a particular website, should not be preloaded, the detected website is not on an allowed list, and/or the like.

If, on the other hand, the system determines that the central device will request the user devices access a website during the predetermined time period at 302, the system will preload at least a portion of the website on the user devices at 303. To assist in minimizing the problems of the conventional systems, the website anticipation system preloads the at least a portion of the website prior to receiving the request from the central device to access the website. In other words, the preloading occurs before the push website request occurs. The system may preload only a portion of the website because only a portion of the website is loaded before the request is received. In other words, while the system may detect that a website will be requested and starts preloading the website, the website might not be fully loaded when the request is received. However, even preloading a portion of the website minimizes the length of time that has to be used waiting for the website to load after the request is received.

Additionally, or alternatively, the system may preload the website on a portion of the user devices. While the website will eventually be loaded on all user devices, in order to reduce a processing and resource load on a network or school system, the website anticipation system may stagger the loading of the website across the user devices. This may include grouping the user devices into groups and loading or start the loading of the website for one group of devices at one time, loading or start the loading of the website for another group of devices at another time, and the like. It should be noted that the subsequent groups may be started before the loading of the website for a preceding group is finished.

The device groupings may be optimized to make the pre-loadings more efficient. Thus, the devices may be grouped based upon network connection attributes (e.g., access speed, download speed, connection quality, etc.), historical loading information (e.g., time a device has taken to load websites, errors that have occurred at particular devices, etc.), a combination thereof, and/or the like. For example, the system may group devices based upon download speeds, connection quality, and historical times it has taken a device to load websites. The system may then start the group of devices that will take the longest time to load the website, as identified based upon these attributes, before other groups. The group having the second longest loading time may be started next, and so on.

Preloading may include caching the website on each of the devices, loading websites in separate tabs to be loaded and fully ready when needed, and/or the like. When preloading the websites, the website may require user credentials or for the user to be authenticated before the website can be fully loaded. In the event that the users and/or user devices have a single sign-on (SSO) authentication scheme available, the system may automatically employ the SSO to authenticate the user. If, however, the user has to provide the credentials, the system may prompt the user to enter the user credentials when this point in the loading occurs. Thus, the user can be authenticated and the website can at least be partially loaded when the website is requested by the central device. In other words, the preloading may include authenticating the user of the device at the website prior to the central device requesting the device access the website.

Preloading may also include resolving any errors that occur during the preloading. Resolving the errors may include the system attempting to and successfully resolving the errors on its own. For example, if a website fails to load, the system may attempt to load it again. Resolving the errors may include notifying a user of the central device that the error has occurred, thereby notifying the teacher of the error and allowing the teacher to attempt to resolve the error. For example, if a website address was invalid, the system may notify the teacher of this. Resolving the errors may include notifying a user of the device itself that the error has occurred, thereby notifying the student of the error and allowing the student to attempt to resolve the error. For example, if user credentials resulted in an unsuccessful authentication of the user, the system may notify the user of this.

Resolving the errors may occur in a hierarchical fashion, for example, the system may attempt to resolve the error and if unsuccessful, notify the user and if the user is unsuccessful at resolving the error, the teacher may be notified. Resolving the errors may also be based upon the error. For example, based upon the error type, the system may know what entity (e.g., system, teacher, student, etc.) can resolve the error. As another example, the error may occur in response to an action by one of the entities and the system may, therefore, notify that entity to resolve the error.

These are only some examples of actions that can be undertaken when preloading a website and are not intended to be limiting. For example, preloading may also include other actions, for example, automatically submitting a website to a firewall allow list while the website is needed and then removing it from the firewall allow list, loading the website to a particular location within the website (e.g., a certain page in a coursebook, a certain paragraph or section on a website, etc.), obtaining teacher authentication, and/or the like. Other actions may also be included in the preloading.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
receiving, at a website anticipation system, an indication of a plurality of user devices to be in operative communication with a central device during a predetermined time period;
detecting, using the website anticipation system, at least one website to be accessed by the plurality of user devices during the predetermined time period, wherein the at least one website is to be requested by the central device; and
prior to the central device requesting the plurality of user devices access the website, preloading, using the website anticipation system, at least a portion of the website on a least a subset of the plurality of user devices.

2. The method of claim 1, wherein the preloading comprises staggering loading of the website across the plurality of devices based upon predetermined groupings of the plurality of user devices.

3. The method of claim 1, wherein the detecting comprises identifying a reference to the website contained in a secondary source corresponding to the central device.

4. The method of claim 1, wherein the detecting is based upon a user of the central device.

5. The method of claim 1, wherein the preloading comprises authenticating a user of each of the plurality of devices at the website prior to the central device requesting the plurality of user devices access the website.

6. The method of claim 1, wherein the preloading comprises caching the website on each of the plurality of devices.

7. The method of claim 1, wherein the preloading comprises resolving errors occurring during the preloading.

8. The method of claim 7, wherein the resolving errors comprises notifying a user of the central device of at least one error occurring during the preloading at one of the plurality of user devices.

9. The method of claim 7, wherein the resolving errors comprises notifying a user of one of the plurality of user devices of at least one error occurring during the preloading at the one of the plurality of user devices.

10. The method of claim 1, wherein the detecting comprises accessing audio occurring during the predetermined time period and identifying a topic corresponding to a website associated with the central device during the predetermined time period.

11. An information handling device, the information handling device comprising:
a plurality of user devices;
a central device;
a processor operatively coupled to the plurality of user devices and the central device;

a memory device that stores instructions that, when executed by the processor, causes the information handling device to:

receive, at a website anticipation system, an indication of the plurality of user devices to be in operative communication with the central device during a predetermined time period;

detect, using the website anticipation system, at least one website to be accessed by the plurality of user devices during the predetermined time period, wherein the at least one website is to be requested by the central device; and prior to the central device requesting the plurality of user devices access the website, preload, using the website anticipation system, at least a portion of the website on a least a subset of the plurality of user devices.

12. The information handling device of claim 11, wherein the preloading comprises staggering loading of the website across the plurality of devices based upon predetermined groupings of the plurality of user devices.

13. The information handling device of claim 11, wherein the detecting comprises identifying a reference to the website contained in a secondary source corresponding to the central device.

14. The information handling device of claim 11, wherein the detecting is based upon a user of the central device.

15. The information handling device of claim 11, wherein the preloading comprises authenticating a user of each of the plurality of devices at the website prior to the central device requesting the plurality of user devices access the website.

16. The information handling device of claim 11, wherein the preloading comprises caching the website on each of the plurality of devices.

17. The information handling device of claim 11, wherein the preloading comprises resolving errors occurring during the preloading.

18. The information handling device of claim 17, wherein the resolving errors comprises notifying a user of the central device of at least one error occurring during the preloading at one of the plurality of user devices.

19. The information handling device of claim 11, wherein the detecting comprises accessing audio occurring during the predetermined time period and identifying a topic corresponding to a website associated with the central device during the predetermined time period.

20. A product, the product comprising:

a computer-readable storage device that stores executable code that, when executed by a processor, causes the product to:

receive, at a website anticipation system, an indication of a plurality of user devices to be in operative communication with a central device during a predetermined time period;

detect, using the website anticipation system, at least one website to be accessed by the plurality of user devices during the predetermined time period, wherein the at least one website is to be requested by the central device; and prior to the central device requesting the plurality of user devices access the website, preload, using the website anticipation system, at least a portion of the website on a least a subset of the plurality of user devices.

* * * * *